United States Patent [19]

Yoshimura et al.

[11] 4,429,989
[45] Feb. 7, 1984

[54] APPARATUS FOR PRESSING ORIGINAL

[75] Inventors: Shigeru Yoshimura, Yokohama; Kiyomichi Ichikama, Kawasaki; Noriyoshi Ueda, Yokohama, all of Japan

[73] Assignee: Canon Kabushiki Kaisha, Tokyo, Japan

[21] Appl. No.: 414,885

[22] Filed: Sep. 3, 1982

Related U.S. Application Data

[63] Continuation of Ser. No. 195,430, Oct. 9, 1980, abandoned.

[30] Foreign Application Priority Data

Oct. 13, 1979 [JP] Japan ............................ 54-132078
Oct. 13, 1979 [JP] Japan ............................ 54-132079
Oct. 13, 1979 [JP] Japan ............................ 54-132080
Oct. 29, 1979 [JP] Japan ............................ 54-150372

[51] Int. Cl.³ .................................................. G03B 27/62
[52] U.S. Cl. ............................................................. 355/76
[58] Field of Search ................... 355/75, 76; 220/211, 220/250, 282, 283

[56] References Cited

U.S. PATENT DOCUMENTS

| | | | |
|---|---|---|---|
| 3,467,469 | 9/1969 | Hastings et al. | 355/75 |
| 3,724,949 | 4/1973 | Kanno et al. | 355/75 |
| 4,124,296 | 11/1978 | Kishi et al. | 355/75 |
| 4,150,896 | 4/1979 | Wakeman | 355/75 |
| 4,172,660 | 10/1979 | Yanofsky et al. | 355/75 |
| 4,210,358 | 7/1980 | Sweet et al. | 220/211 |

Primary Examiner—Monroe H. Hayes
Attorney, Agent, or Firm—Fitzpatrick, Cella, Harper & Scinto

[57] ABSTRACT

The present invention relates to apparatus for pressing an original useful for an image forming apparatus such as a copying machine, printer or recording apparatus. More particularly, the present invention is directed to such original pressing apparatus which is able to press even a thick original and which can be opened and closed not only automatically but also manually. The original pressing apparatus of the invention comprises an original pressing member, a supporting member for supporting said pressing member swing movably, an arm engageable with said pressing member for automatic opening and closing of said pressing member, a driving source to rotate said arm and means for rendering said arm free movable when the original pressing member is not in automatic opening and closing operation. Thus, the original pressing member can be opened and closed manually when it is not in automatic opening and closing operation. Another aspect of the invention is an original pressing apparatus comprising an original pressing member, a supporting member of supporting said pressing member up and down movably and also swing movably, an arm having a rotation axis in the vicinity of the rotation axis of said supporting member and disposed to automatically open and close said pressing member and a driving source for rotating said arm. The engaging point at which the arm and the pressing member get engaged with each other lies within the area where the straight line extending through the gravity center of the pressing member and a point adjacent one side end of the supporting member intersects the straight line extending through said gravity center and a point adjacent the other side end of the supporting member.

7 Claims, 8 Drawing Figures

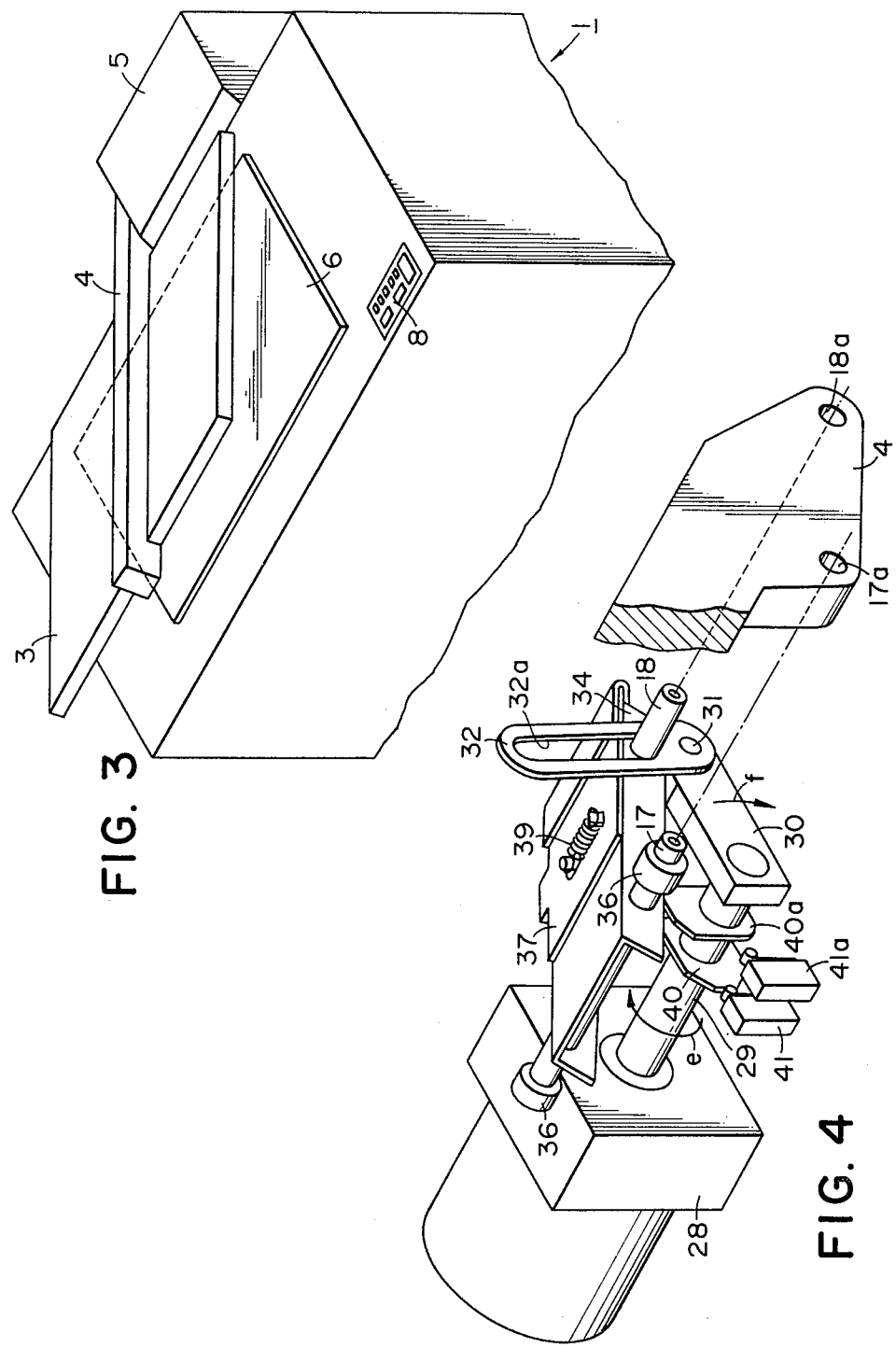

APPARATUS FOR PRESSING ORIGINAL

This is a continuation, of application Ser. No. 195,430, filed Oct. 9, 1980, now abandoned.

BACKGROUND OF THE INVENTION

1. Field of the Invention

The present invention relates to apparatus for pressing an original useful for an image forming apparatus such as a copying machine, printer or recording apparatus. More particularly, the present invention is directed to such automatic opening and closing type of original pressing apparatus which is able to press an original against an original table in good contact state even when the original is relatively thick and which allows a manual opening and closing operation whenever it is desired.

2. Description of the Prior Art

In an image forming apparatus such as a copying machine there is usually provided a pressing plate to shade the illumination light directed to an original laid on an original table also to bring the original which may be a sheet or a book into intimate contact with the surface of the original table. Recently, for the purpose of improvement in maneuverability of such image forming apparatus, the original pressing plate sometimes has been so designed as to be opened and closed automatically. However, such automatically opening and closing pressing plate hitherto known has some disadvantages. Most of the known automatic pressing plates allow no manual operation. It is very inconvenient to the operator in particular when the wishes to operate the plate manually in an emergency. Some automatic pressing plates are known which can be opened and closed also manually when it is wished. However, such manual operation is made possible only when the operator changes over the position of the plate from that for automatic operation to a manual one by using a change-over lever or the like. See, for example, U.S. Pat. No. 3,724,949.

Also, in the known pressing apparatus there was the possibility that the operator fails to notice the fact that the pressing plate is of automatic type. In such case, the operator may open or close it manually by an unreasonable force which will result in breakdown of the apparatus.

Another disadvantage involved in the known original pressing apparatus is that the post supporting the pressing plate has to be moved up and down to press a thick original against the original table. This is not only troublesome but also makes the mechanism complicated.

SUMMARY OF THE INVENTION

Accordingly it is an object of the invention to provide an automatically opening and closing type of original pressing apparatus which can press the original into good contact with the original table.

It is another object of the invention to provide such original pressing apparatus which can press the original well and uniformly even when the original is thick.

It is a further object of the invention to provide such original pressing apparatus which is simple in structure and functions well even when the original is thick.

It is a further object of the invention to provide such original pressing apparatus in which the pressing member can be opened and closed manually so long as it is not in automatic opening and closing operation.

It is still a further object of the invention to provide such original pressing apparatus which has means for protecting the pressing member from damage when it is overloaded.

It is an even further object of the invention to provide such original pressing apparatus which can readily be changed over from an automatic operation to a manual one when a massive document or a large size original is placed for image formation thereof and in which the image formation can be carried out while keeping the pressing member in its closed or opened position.

Other and further objects, features and advantages of the invention will appear more fully from the following description taken in connection with the accompanying drawings.

BRIEF DESCRIPTION OF THE DRAWINGS

FIG. 3 is a view similar to FIG. 1 showing another embodiment of the invention;

FIGS. 4, 5 and 6 show, in perspective view, the arm driving mechanism in different phases of operation;

DESCRIPTION OF THE PREFERRED EMBODIMENTS

Figures 1, 2:
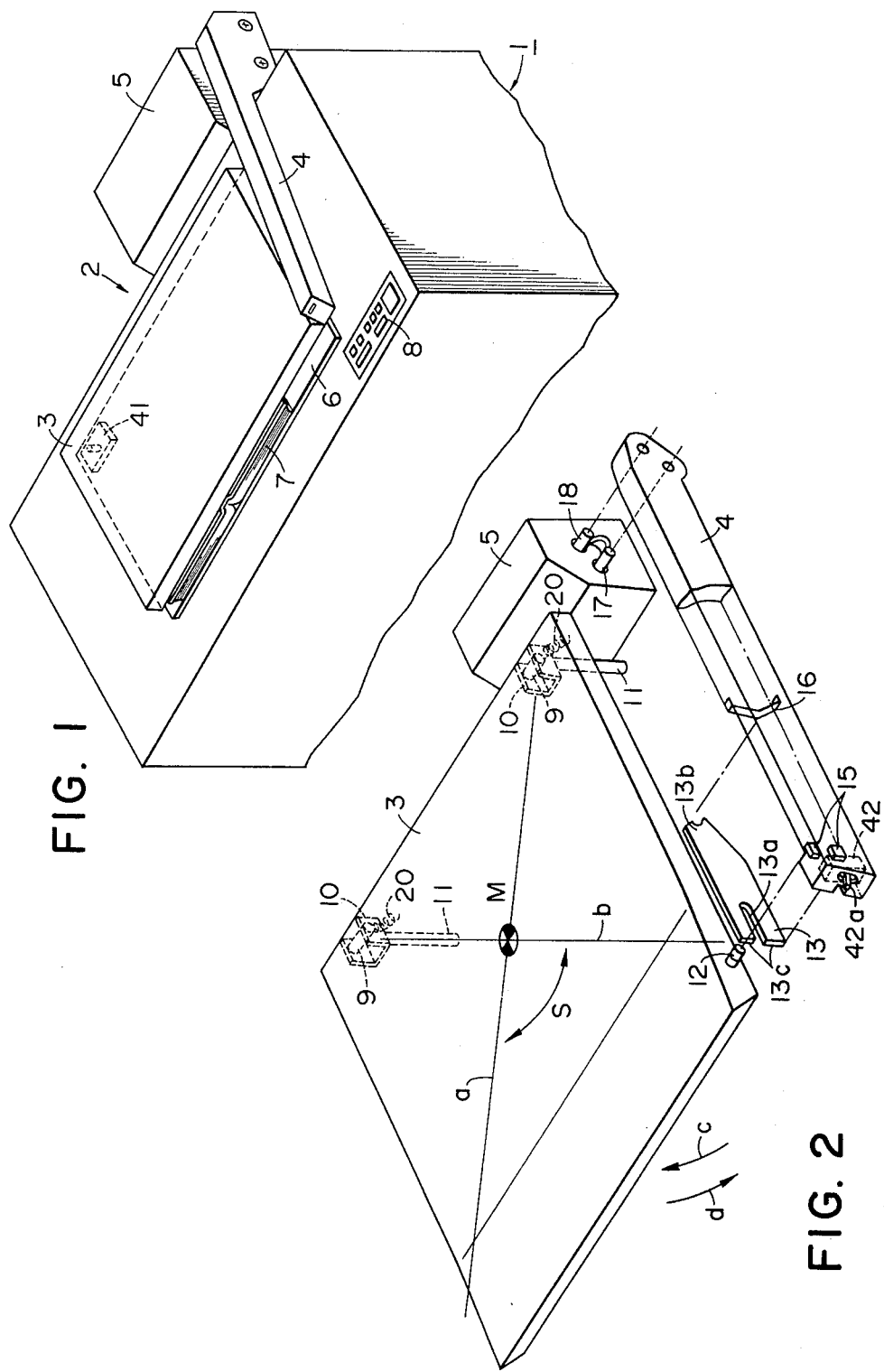
FIG. 1 is a perspective view of a copying machine in which the present invention is embodied.
FIG. 2 is a perspective view of an original pressing apparatus showing an embodiment of the invention.

Referring first of FIGS. 1 and 2 there is shown a copying machine to which an original pressing apparatus according to a first embodiment of the invention is applied.

In FIG. 1, reference numeral 1 generally designates the main body of the copying machine and 2 generally designates the original pressing apparatus. The original pressing apparatus comprises an original pressing plate 3, an arm 4 and a driving unit 5. Designated by 6 is a glass surface of an original table provided on the upper surface of the machine body 1. An original 7 to be copied is laid on the glass surface 6 and then covered with the pressing plate 3 which presses the original against the glass plate to form an intimate contact therebetween for copying operation. Designated by 8 is an operation panel.

The structure of the original pressing apparatus is described in detail with reference to FIG. 2.

The original pressing plate 3 is supported by a supporting member 10 and is swing movable about a shaft 9. The supporting member 10 is fixed to a post 11 which is in turn supported slide movably upwardly and downwardly along a guide pipe (not shown) provided at the side of the machine body 1. Thus, when a thick original such as a book original is placed on the original table, the original pressing plate 3 moves upward with the upward slide movement of the post 11 so as to accommodate itself to the thickness of the original. At a point on the side surface of the pressing plate 3 there is fixed an engaging member 12 through which the pressing plate is opened and closed by the arm 4. The point at which the engaging member is fixed to the pressing member lies within the area S defined by two straight lines a and b. As seen in FIG. 2, the line a passes through one post 11 and the gravity center M of the plate 3 and line b passes through the other post 11 and the gravity center M.

In this manner, the pressing plate 3 is connected to the machine body 1 at the rear end of the plate through the posts 11, 11 and is supported by the arm 4 at its front end portion through the engaging member 12 so that the pressing member 3 can be opened and closed relative to the machine body. As will be later described in detail, the arm 4 is mounted on shafts 17 and 18 disposed in the vicinity of the rotation axis of the supporting member 10 to connect the rear end portion of the arm with the driving unit 5. Therefore, when the driving unit 5 is brought into operation, the arm is rotated about the shafts 17 and 18 in the direction of arrow c or d for opening or closing. The force of the arm 4 applied to the pressing plate 3 to open and close the latter is not transmitted to the post 11. Only a rotational motion of the plate 3 about the axis 9 is caused by the force of the arm 4. Since, as noticed above, the front end portion of the pressing member 3 is connected to the arm 4 within the area S, the post 11 is never moved upward by the force of the arm and therefore the pressing plate 3 is never shifted vertically. The pressing plate conducts only opening and closing rotational motions in the directions of arrows c and d.

When a thick original such as a book original 7 is to be pressed against the glass surface 6 by the pressing plate 3 as shown in FIG. 1, then the post 11 slide moves upward up to a position corresponding to the thickness of the original 7. Namely, when the pressing plate 3 is swing moved closing in the direction indicated by the arrow d with the downward rotation of the arm 4 and the pressing plate 3 comes into contact with the upper surface of the thick original 7, the post 11 begins to slide move upward. The pressing plate 3 lying on the book original 7 remains spaced from the glass surface 6 of the original table so that the thick original 7 is pressed against the glass surface 6 by the weight of the pressing plate. In this manner, according to the shown embodiment, it is possible to press any original against the glass surface uniformly even when the original is thick.

While the arm 4 has been shown to be connected with the pressing plate 3 at its one side, the mounting position of the arm 4 is never limited thereto only. It may be provided at the middle portion of the pressing plate 3 as shown in FIG. 3. However, in this connection, it should be noted that the point at which the pressing plate engages with the arm most be within the above defined area. The pressing plate may be supported by a single wide post. In this case, the straight lines a and b defining the area S should be extended from two side end points of the wide post.

In the embodiment described above there is provided a safety mechanism for protecting the driving unit etc. from being damaged when any overload is applied to the pressing plate etc. The arrangement of the safety mechanism will be described hereinafter.

According to the embodiment shown in FIG. 2, the safety mechanism is constituted of a click plate 13 interposed between the arm 4 and pressing plate 3. The click plate 13 has an elongate slot 13a for receiving the engaging member 12. When the engaging member 12 is engaged in the elongate slot 13a, the latter allows the former to slide in the slot. The elongate slot 13a is formed by cutting out the clock plate from the front end thereof. The function of the elongate slot 13a is to absorb any positional divergence between the rotation centers 9 and 17 of the pressing plate 3 and arm 4 when they are not alignment with each other. To this end, the click plate 13 with the engaging member 12 engaged in the elongate slot 13a is held in the position by the arm 4 through a click receiving member 15 and a click spring 16. The click receiving member 15 is provided at the tip portion of the arm to receive the front end of the click plate and the click spring 16 is provided to support the rear end of the click plate. With this arrangement, if a load larger than the spring force of the click spring 16 for holding the rear end portion 13b of the click plate is applied to the click plate 13, that is, if any unduly large torque is applied between the arm 4 and pressing plate 3, then the click plate 13 rotates about its shoulder portion 13c supported by the click receiving member 15 serving as a fulcrum. As a result, the click plate 13 is disengaged from the click spring 16 and therefore the arm 4 and the pressing plate 3 get disengaged from each other. Thus, transmission of the excess load to driving means etc. can be prevented and the apparatus can be protected from damage by such overload. In this manner, the click plate constitutes effective safety means for preventing the apparatus from being damaged by any excessive force occasionally applied thereto by the operator during operation and for preventing other unexpected accidents. The click plate 13 once disengaged in the manner described above can easily be remounted between the pressing plate 3 and arm 4. In case that a clutch is used to automatically open and close the pressing plate, the same effect as above can be attained by cutting off the clutch.

In the embodiment described above, the pressing plate can be opened and closed also manually except at the time an automatic opening and closing operation is being performed. The mechanism of the driving unit and means for allowing such manual operation will be described in detail hereinafter with reference to FIGS. 4, 5 and 6.

As previously described, the arm 4 is connected, at its rear end portion, with the arm shaft 17 and the arm driving shaft 18. These shafts become the centers of rotation when the arm is rotated. The connection between the arm 4 and the shafts 17, 18 is made by means of slots 17a, 18b respectively. At the other end, the shafts 17, 18 are connected with the internal mechanism of the driving unit 5 so as to drive the arm 4 rotating in the directions of arrows c and d through the shafts 17 and 18.

FIG. 4 shows the inner part of the driving unit 5. A crank arm 30 is fixedly mounted on the free end of the output shaft 29 of a motor 28. Also mounted on the output shaft 29 is a cam 40 the rotation of which is detected by a control switch 41. The cam 40, control switch 41 and a control circuit (not shown) control the timing of rotation of the crank arm 30. At the other end, the crank arm 30 is rotatably connected with one end of a crank link 32 through a dowel 31. At the other end of the crank link 32 is provided an elongate slot 32a in which the arm driving shaft 18 is engaged. The arm driving shaft 18 is supported by an angle member 34 swing movable about the arm shaft 17 which is in turn supported by a bearing 36 at a side plate of the machine body (not shown).

The manner of operation of the above embodiment is as follows:

At first, description will be made of the closing motion of the pressing plate 3. Normally, the pressing plate 3 is in its open position, that is, in the position upwardly rotated relative to the glass surface 6 of the original table. In this position, the crank arm 30 is in its home position, namely, in the position for waiting in which its dowel 31 is at the upper dead point (FIG. 4). Therefore, the crank link 32 is also in its uppermost position and the arm driving shaft 18 is in contact with the bottom end of the elongate slot 32. In this position, the operator is allowed to manually move the arm 4 from the open position to close position. During the manual operation of the arm, the arm driving shaft 18 can move gradually upward along the slot 32a in which the shaft 18 is engaged. The distance which the shaft is allowed to move is determined by the length of the elongate slot 32a. Thus, the pressing plate 3 engaging with the arm 4 can be operated manually at the operator's will within a range of angle corresponding to the length of the elongate slot 32a so long as the crank arm 30 is standing at its upper dead point. The range of angle can be suitably selected by changing the length of the elongate slot and therefore it is possible to cover all the opening and closing course of the pressing plate 3.

For automatic closing of the pressing plate 3, a determined closing signal (not shown) which may be a copy signal is applied to the motor 28 from the copying machine body side to energize the motor. The output shaft 29 starts rotating in the direction of arrow e and thereby the crank arm 30 is rotated in the direction of f starting from the upper dead point. The crank line 32 starts moving gradually downward and after pressing a slide plate 37 as described later the crank link reaches its lower dead point. At the time point, the arm driving shaft 18 comes into contact with the upper end of the elongate slot 32a (FIG. 5).

Figure 5:
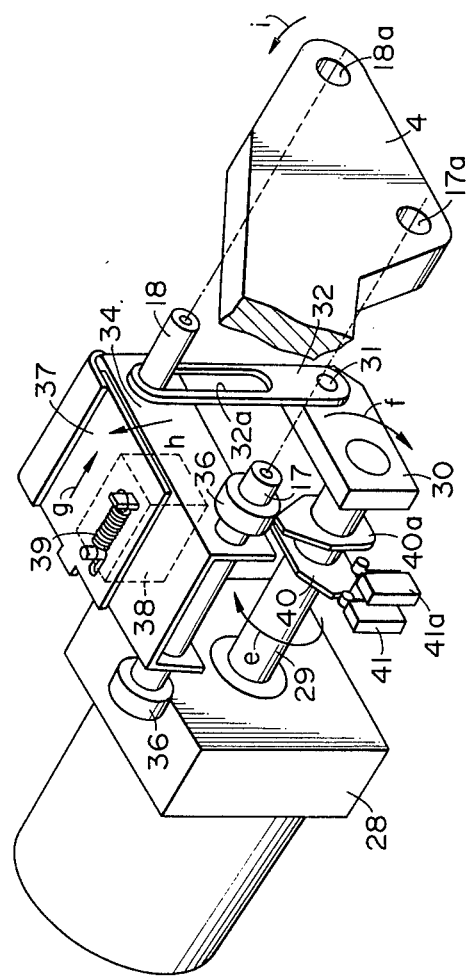
Figure 6:
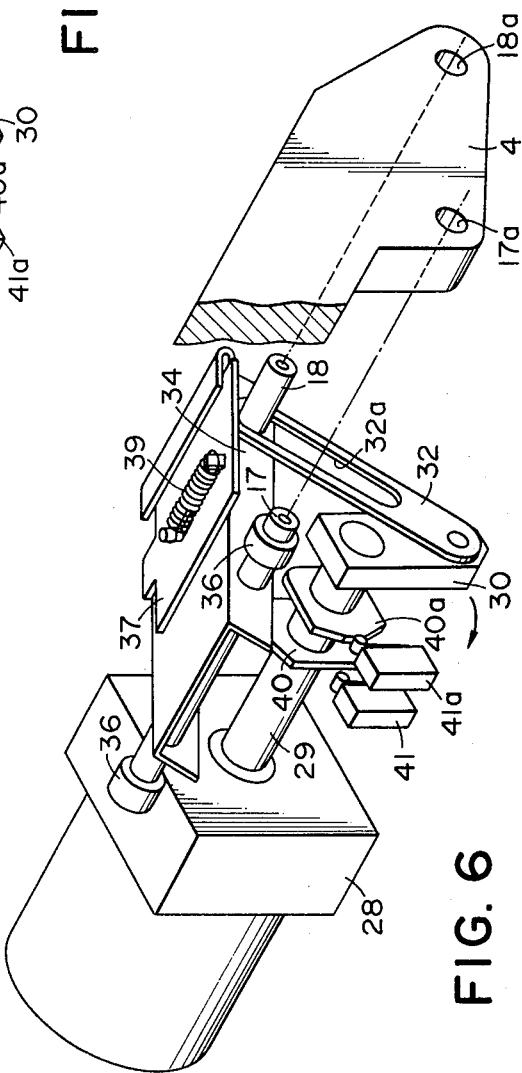

In the position shown in FIG. 5, the rotating cam 40 turns the microswitch 41a on so that a solenoid 38 is actuated to move the slide plate 37 in the direction of arrow g. Since the slide plate 37 is so disposed as to be slide movable along the upper surface of the angle member 34, the solenoid 38 moves the slide plate 37 from the position shown in FIG. 5 to the position in which the slide plate lies on the top of the crank link 32 beyond the side edge of the angle member 34 (FIG. 6). In this position, further rotation of the crank arm 30 causes the arm driving shaft 18 to follow the movement of the crank link 32 with which the driving shaft is in engagement at the upper end of its elongate slot 32a. Thus, closing motion of the pressing plate 3 is initiated. More particularly, since the crank arm 30 continues rotating passing the lower dead point, the crank link 32 begins to move upward again. However, since the top of the crank line 32 abuts on the overhung slide plate 37, the upward movement of the crank link is blocked by the slide plate as seen from FIG. 6 and instead the angle member 34 is rotated about the arm shaft 17 in the direction of arrow h by the upward force. With the rotation of the angle member the arm driving shaft 18 also moves rotating in the direction of arrow h and therefore the slot 18a of the arm 4 is rotated about the slot 17a in the direction of arrow i so as to close the pressing plate 1.

Even when the current to the solenoid 38 is cut off immediately after the start of closing motion of the pressing plate, the slide plate 37 is never returned to its original position because of the pressure contact between the slide plate and the top end of the crank link. The slide plate 37 is allowed to return to its starting position under the action of a returning spring 39 only when the contact pressure is removed. The slide plate is released from the pressure contact when the pressing plate 3 enters gravitational self-falling angular area passing after self-standing angular area. After the slide plate being returned to its starting position, the pressing plate continues its closing motion while keeping the arm driving shaft 18 contacting with the upper end of the elongate slot 32a. When the pressing plate 3 reaches the glass surface 6 of the original table, the cam plate 40a turns the microswitch 41a on which constitutes a detection signal of the arrival of the pressing plate at the original table. By this detection signal the motor 21 is stopped and the arm driving shaft 18 remains engaged with the upper end of the elongate slot 32a.

In case that a thick original is on the original table, the pressing plate 3 stops rotating when it comes into contact with the original and the output shaft 29 terminates its one revolution. After completion of a copying operation for making a desired number of copies, a control signal is applied to the motor 21 to drive it again. Then, the pressing plate 3 is brought to its open position ready for the next copying operation.

Since, as previously noted, the arm driving shaft 18 remains engaged with the upper end of the elongate slot 32a even when the pressing plate 3 is in its closed position, a manual opening and closing operation of the pressing plate is allowed also in this closed position in the same way as in the case of the above described opened position. Stopping of the motor 21 after closing of the pressing plate may be carried out also by directly detecting the closing of the pressing plate by a microswitch 41b.

Now, the manner of operation for opening the pressing plate 3 will be described.

In the above waiting position in which the crank arm is at its upper dead point and manual operation is allowable, a signal is applied to the motor 28 to start it rotating in the direction of arrow e and to rotate the crank arm 30 in the direction of arrow f. With the rotation of the crank arm 30 in the arrow f, the crank link 32 is also rotated in the direction of arrow f with the upper end of its elongate slot 25a being engaged with the arm driving shaft 18. Since the arm 4 is connected with the arm driving shaft 18 and the arm shaft 17 slots 18a and 17a respectively, the arm 4 rotated about the slot 17a in the direction of arrow e so as to open the pressing plate 3. When the crank arm 30 reaches the lower dead point, the pressing plate is opened completely and gets in self-standing position under the action of a spring mechanism 20 provided in the supporting member 10 for the pressing plate. The crank arm 30 continues further rotating and stops when it reaches the original upper dead point. In this position, as described above, the pressing plate can be operated manually. The above mentioned spring mechanism 20 is disposed between the pressing plate 3 and the main body of the copying machine.

While in the above embodiment the supporting member for the pressing plate has been shown and described to be vertically movable, the present invention is never limited to such embodiment only. The present invention can be applied with advantage to all of such apparatus in which an arm and an original pressing plate are engaged with each other to effect automatic opening and closing of the pressing plate.

As readily understood from the foregoing the present invention brings forth various advantages. The pressing plate 3 can move vertically according to the thickness of the original and therefore it can readily accommodate itself to any thick original. These advantages can be obtained without losing the merit of automatic opening and closing pressing plate. Further, according to the invention, the arm 7 can be disengaged from the pressing plate when an excess load is applied to the latter. In addition, manual opening and closing operation of the pressing plate 3 is allowed except the time when an automatic opening and closing operaing is going. The pressing apparatus according to the invention can be changed over from automatic operation to manual operation promptly whenever the operator does not wish automatic opening and closing the pressing plate. Image formation can be carried out while keeping the pressing plate in its closed position or in its open position.

Figure 7:
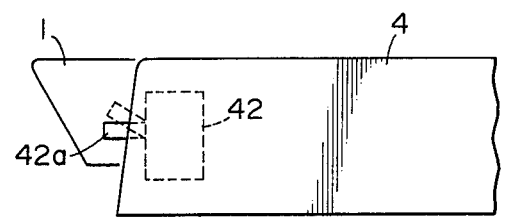
FIG. 7 is a side view of the arm tip end part.

FIG. 7 is a side view of the tip end portion of the arm 4. In the tip end portion of the arm 4 there is provided a switch 42. The operation lever 42a of the switch extends from the arm end and is easy to operate. By turning the lever 42a On or Off (the solid line indicates the On position and the broken line does the Off position), the switch 42 cuts in or off the control signal to the driving unit 5 of the automatic pressing plate opening and closing apparatus coming from the copying machine side. On-Off of the switch 42 by the operation lever 42a may be used to throw in or cut off the power source to the driving unit 5. In any case, the operator can easily change over the pressing plate opening and closing operation from automatic mode to manual mode by using the switch 42 and also the operator can carry out the copying operation while keeping the pressing plate open or closed. For example, when a bulky or especially large size original is to be copied, the operator can carry out the copying operation while keeping the pressing plate 3 in its open position by turning the switch lever 42a to the Off position indicated by the broken line to cut off the control signal. Thus, copying operation can be carried out conveniently and smoothly even when the original is bulky or very large.

Since the operation switch 42 is mounted in the arm 4, this embodiment can be realized in the conventional copying machine provided with a manual operation type of pressing plate without any need of additional change of operation part and control circuit in the main copying machine. Also, since the operation switch 42 is mounted on the arm 4, an easy On-Off operation of the switch is assured. Of course the operation switch may be mounted on other member than the arm 4.

Figure 8:
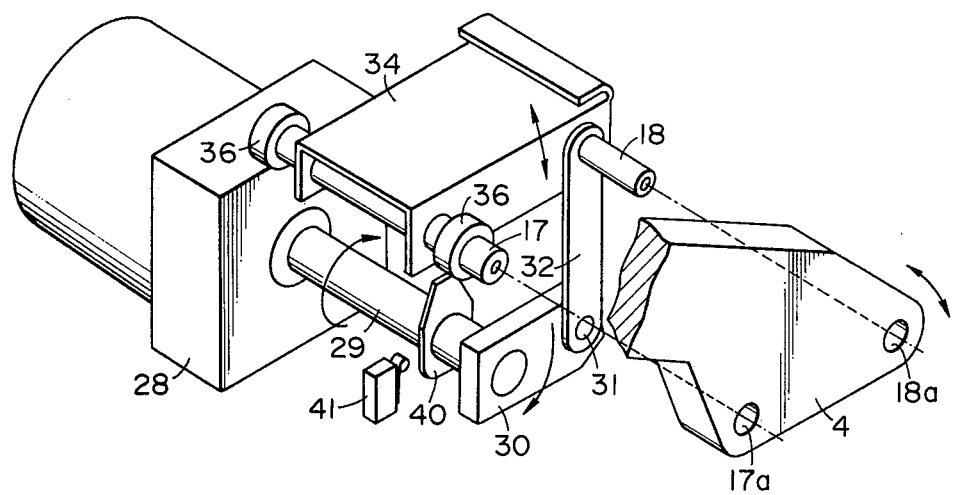
FIG. 8 shows a further embodiment of the invention.

When the above embodiment is applied to an automatic only type of apparatus in which the pressing plate is opened and closed solely automatically and never manually, the crank link 32 and the arm driving shaft 18 can be connected directly without the use of above elongate slot. FIG. 8 shows such arrangement. This arrangement also always assures good pressing of original by the pressing plate. Similarly, when the present invention is applied to such apparatus in which the original pressing plate is automatically opened and its closing is carried out manually only, the slide plate 37 may be omitted. Also, the angle member 34 is not always necessary. Of course it is also possible to mount the slide plate 37 on the arm 4.

While the invention has been particularly shown and described with reference to preferred embodiments thereof, it will be understood by those skilled in the art that the foregoing and other changes in form and details can be made therein without departing from the spirit and scope of the invention.

What we claim is:

1. A device for automatically opening and closing an original pressing member for pressing an original against an original supporting surface, said device comprising:
   an original pressing member having a rotating center freely slidably perpendicular of the original supporting surface about which center the pressing member is pivotable relative to the original supporting surface;
   a rotatable driving shaft provided independently from said rotating center for automatically closing and opening said original pressure member;
   a supporting arm engaging with said driving shaft for receiving the drive from said driving shaft so as to be rotated, said supporting arm being movably engaged with said original pressing member;
   motor means; and
   connecting means to transmit the driving force of said motor means to said rotatable driving shaft.

2. A device according to claim 1, wherein said supporting arm engages said original pressing member within a front side area of said original pressing member defined by two straight lines which intersects each other, with one line extending through the gravity center of said pressing member and a point adjacent one lateral end of said pressing member and with the other line extending through the gravity center of said pressing member and a point adjacent the other lateral end of said pressing member.

3. A device according to claim 1, further comprising safety means for disengaging said supporting arm from said pressing member when a load larger than a pedetermined value is applied to said pressing member.

4. A device according to claim 1, wherein said safety means comprises a click plate and a click spring.

5. A device according to claim 1, wherein a plurality of said supporting arms are provided, the front side area of said pressing member being defined by a plurality of lines intersecting each other, with one line extending through the gravity center of said pressing member and one of said supporting arms at one lateral end and with the other line extending through the gravity center and another of said plurality of said supporting arms at the other lateral end.

6. A pressing device according to claim 1, wherein said supporting arm is mounted on one lateral end of said original pressing member.

7. A pressing device according to claim 1, further comprising control means, between the original table and said original pressing member, for detecting movement of said original pressing member and for controlling the timing of the operation of said motor means.

* * * * *